(12) United States Patent
Koike et al.

(10) Patent No.: US 9,890,479 B2
(45) Date of Patent: Feb. 13, 2018

(54) POLYURETHANE RESIN, POLYURETHANE RESIN COMPOSITION, AND METHOD FOR MANUFACTURING POLYURETHANE RESIN

(71) Applicants: SANYO CHEMICAL INDUSTRIES, LTD., Kyoto (JP); TORAY OPELONTEX CO., LTD., Tokyo (JP)

(72) Inventors: Yusuke Koike, Kyoto (JP); Shinpei Funaoka, Kyoto (JP); Kenzo Hori, Kyoto (JP); Toshihiro Tanaka, Shiga (JP); Shingo Ito, Shiga (JP); Hiroshi Takayama, Shiga (JP)

(73) Assignees: SANYO CHEMICAL INDUSTRIES, LTD., Kyoto (JP); TORAY OPELONTEX CO., LTD., Tokyo (JP)

( * ) Notice: Subject to any disclaimer, the term of this patent is extended or adjusted under 35 U.S.C. 154(b) by 0 days.

(21) Appl. No.: 15/029,035

(22) PCT Filed: Oct. 16, 2014

(86) PCT No.: PCT/JP2014/077617
§ 371 (c)(1),
(2) Date: Apr. 13, 2016

(87) PCT Pub. No.: WO2015/056761
PCT Pub. Date: Apr. 23, 2015

(65) Prior Publication Data
US 2016/0257775 A1    Sep. 8, 2016

(30) Foreign Application Priority Data

Oct. 17, 2013  (JP) .................................. 2013-216560

(51) Int. Cl.
*C08G 18/10* (2006.01)
*D01F 6/70* (2006.01)
(Continued)

(52) U.S. Cl.
CPC ............... *D01F 6/70* (2013.01); *C08G 18/10* (2013.01); *C08G 18/42* (2013.01);
(Continued)

(58) Field of Classification Search
CPC .... C08G 18/10; C08G 18/42; C08G 18/4854; C08G 18/4858; C08G 18/4883;
(Continued)

(56) References Cited

U.S. PATENT DOCUMENTS 5,800,920 A * 9/1998 Umezawa .............. C08G 18/10
                                                                       428/364
5,962,130 A    10/1999 Umezawa et al.
(Continued)

FOREIGN PATENT DOCUMENTS

CN         1439662       9/2003
CN       101484620       7/2009
(Continued)

OTHER PUBLICATIONS

Polyurethane Stabilization/Anti Degradation Measures and New Modification Technologies for Specific Purposes, 1st edition, Sep. 29, 2004, p. 235, with partial translation.
(Continued)

*Primary Examiner* — Michael L Leonard
(74) *Attorney, Agent, or Firm* — Wenderoth, Lind & Ponack, L.L.P.

(57) ABSTRACT

The present invention relates to a polyurethane resin including, as constituent units, a diol (a1) having a number average molecular weight of 500 to 10,000, an organic diisocyanate (b), and a chain extender (a2). The total concentration of urethane groups and urea groups in the polyurethane resin is 1.25 to 2.50 mmol/g based on the weight of the polyurethane (Continued)

resin. Hard segment domains of the polyurethane resin have an average domain size of 20 to 30 nm as measured with an atomic force microscope.

10 Claims, 2 Drawing Sheets

(51) Int. Cl.
  *C08G 18/48* (2006.01)
  *C08G 18/72* (2006.01)
  *C09D 175/08* (2006.01)
  *C08G 18/42* (2006.01)
  *C08J 5/18* (2006.01)
  *D04H 1/56* (2006.01)
  *C08G 18/76* (2006.01)

(52) U.S. Cl.
  CPC ..... *C08G 18/4854* (2013.01); *C08G 18/4858* (2013.01); *C08G 18/4883* (2013.01); *C08G 18/72* (2013.01); *C08G 18/7671* (2013.01); *C08J 5/18* (2013.01); *C09D 175/08* (2013.01); *D04H 1/56* (2013.01); *C08G 2190/00* (2013.01); *C08J 2375/08* (2013.01)

(58) Field of Classification Search
  CPC ....... C08G 18/72; C08G 18/7671; D01F 6/70; D04H 1/56
  See application file for complete search history.

(56) References Cited

U.S. PATENT DOCUMENTS

| | | | | |
|---|---|---|---|---|
| 6,399,003 | B1* | 6/2002 | Umezawa | C08G 18/282 264/176.1 |
| 2009/0286441 | A1 | 11/2009 | Yamamoto et al. | |
| 2010/0087593 | A1 | 4/2010 | Nakamura et al. | |
| 2010/0249285 | A1* | 9/2010 | Tanaka | C08G 18/285 524/100 |
| 2012/0029146 | A1 | 2/2012 | Matsui et al. | |

FOREIGN PATENT DOCUMENTS

| | | |
|---|---|---|
| CN | 101679593 | 3/2010 |
| EP | 2 154 168 | 2/2010 |
| EP | 2 829 642 | 1/2015 |
| JP | 41-00488 | 1/1966 |
| JP | 5-009256 | 1/1993 |
| JP | 2001-172822 | 6/2001 |
| JP | 2002-517533 | 6/2002 |
| JP | 2003-261642 | 9/2003 |
| JP | 2009-191415 | 8/2009 |
| JP | 2013-144861 | 7/2013 |
| TW | 499450 | 8/2002 |
| TW | 201333289 | 8/2013 |
| WO | 2008/149682 | 12/2008 |

OTHER PUBLICATIONS

International Search Report dated Jan. 20, 2015 in corresponding International Application No. PCT/JP2014/077617.
International Search Report dated Jan. 20, 2015 in International (PCT) Application No. PCT/JP2014/077619.

* cited by examiner

POLYURETHANE RESIN, POLYURETHANE RESIN COMPOSITION, AND METHOD FOR MANUFACTURING POLYURETHANE RESIN

TECHNICAL FIELD

The present invention relates to a polyurethane resin. Specifically, the present invention relates to a polyurethane resin, a polyurethane resin composition, and a method of producing a polyurethane resin.

BACKGROUND ART

Polyurethane resins have excellent stretching properties. These resins thus have been widely used in materials for elastomers such as paints, coating agents, sealing materials, adhesives, fiber processing agents, artificial or synthetic leathers, and rolls, and fiber products. A need exists in these applications for improvement in heat resistance of polyurethane resins without sacrificing their stretching properties (residual strain and elongation), in order to prevent deterioration due to the thermal history in manufacturing or processing a final product from a polyurethane resin, or in order to provide a final product with improved durability.

Non Patent Literature 1, for example, discloses a method of adjusting the urethane group concentration and/or the urea group concentration of a polyurethane resin in order to improve the heat resistance.

CITATION LIST

Non Patent Literature

Non Patent Literature 1: Technical Information Institute Co., Ltd., "Poriuretan no anteika rekka taisaku to mokuteki ni oujita atarashii kaishitsu gijutsu (Polyurethane Stabilization/Anti Degradation Measures and New Modification Technologies for Specific Purposes)", 1st edition, Sep. 29, 2004, p. 235

SUMMARY OF INVENTION

Technical Problem

However, an increase in the urethane group concentration and/or the urea group concentration of a polyurethane resin according to the above method tends to be accompanied by a decrease in the residual strain or the elongation of the resin. This method is effective to some extent, but it fails to sufficiently improve the heat resistance and the stretching properties.

The present invention aims to provide a polyurethane resin having high heat resistance and excellent stretching properties (residual strain and elongation) and to provide a method of producing a polyurethane resin.

Solution to Problem

The present inventors made intensive studies to solve the above problem and arrived at the present invention. The present invention relates to a polyurethane resin including, as constituent units, a diol (a1) having a number average molecular weight of 500 to 10,000, an organic diisocyanate (b), and a chain extender (a2), the total concentration of urethane groups and urea groups in the polyurethane resin being 1.25 to 2.50 mmol/g based on the weight of the polyurethane resin, hard segment domains of the polyurethane resin having an average domain size of 20 to 30 nm as measured with an atomic force microscope. The present invention also relates to a polyurethane resin composition containing the polyurethane resin and an additive. The present invention also relates to a method of producing the polyurethane resin, including the step of reacting an isocyanate group-containing urethane prepolymer (p), an organic diisocyanate (b2), and a chain extender (a2), wherein the isocyanate group-containing urethane prepolymer (p) is obtained by reacting a diol (a1) having a number average molecular weight of 500 to 10,000 and an organic diisocyanate (b1), and the method satisfies the following requirements (1) to (3):

(1) The ratio of the number of moles of the diol (a1) having a number average molecular weight of 500 to 10,000 to the number of moles of the organic diisocyanate (b1) is as follows: The ratio diol (a1) having a number average molecular weight of 500 to 10,000:organic diisocyanate (b1) is 1:1.05 to 1:1.5;

(2) The total number of moles of the organic diisocyanate (b1) and the organic diisocyanate (b2) is 1.3 to 4.2 times the number of moles of the diol (a1) having a number average molecular weight of 500 to 10,000; and (3) The total number of moles of the diol (a1) having a number average molecular weight of 500 to 10,000 and the chain extender (a2) is equal to the total number of moles of the organic diisocyanate (b1) and the organic diisocyanate (b2).

Advantageous Effects of Invention

The polyurethane resin of the present invention has high heat resistance and excellent stretching properties. Fibers containing the polyurethane resin of the present invention have excellent heat-setting properties.

DESCRIPTION OF EMBODIMENTS

The polyurethane resin of the present invention includes, as constituent units, a diol (a1) having a number average molecular weight of 500 to 10,000, an organic diisocyanate (b); and a chain extender (a2).

Examples of the diol (a1) having a number average molecular weight of 500 to 10,000 include polyoxyalkylene diols (a11), polyester diols (a12), polyetherester diols (a13), polybutadiene diols (a14), and mixtures of two or more thereof.

Examples of the polyoxyalkylene diols (a11) include compounds containing a C2-C20 dihydric alcohol with an alkylene oxide (hereinafter simply "AO") added thereto, and mixtures of two or more thereof, Examples of the C2-C20 dihydric alcohol include C2-C12 aliphatic dihydric alcohols [e.g., linear alcohols such as ethylene glycol (hereinafter simply "EG"), 1,3-propylene glycol, 1,4-butanediol (hereinafter simply "1,4-BG"), 1,5-pentanediol, 1,6-hexanediol, 1,7-heptanediol, 1,8-octanediol, 1,9-nonanediol, 1,10-dodecanediol, and diethylene glycol (hereinafter simply "DEG"); branched alcohols such as 1,2-, 1,3- or 2,3-butanediol, neopentyl glycol, 2,2-diethyl-1,3-propanediol, 2-methyl-1,5-pentanediol, 3-methyl-1,5-pentanediol, 2-methyl-1,6-hexanediol, 3-methyl-1,6-hexanediol, 2-methyl-1,7-heptanediol, 3-methyl-1,7-heptanediol, 4-methyl-1,7-heptanediol, 2-methyl-1,8-octanediol, 3-methyl-1,8-octanediol, and 4-methyloctanediol]; C6-C20 alicyclic dihydric alcohols [e.g., 1,4-cyclohexanediol, 1,4-bis(hydroxymethyl)cyclohexane, 2,2-bis(4-hydroxycyclohexyl)propane]; and C8-C20 aromatic ring-containing dihydric alcohols [e.g., m- or p-xylylene glycol, bis(hydroxyethyl)benzene, bis(hydroxyethoxy)benzene, bisphenol A ethylene oxide adducts]. The dihydric alcohols may be used alone or in combination of two or more.

Examples of the AO to be added to the dihydric alcohol include ethylene oxide (hereinafter simply "EO"), propylene oxide (hereinafter simply "PO"), 1,2-butylene oxide, 1,3-butylene oxide, 2,3-butylene oxide, tetrahydrofuran (hereinafter simply "THF"), 3-methyltetrahydrofuran (hereinafter simply "3M-THF"), styrene oxide, α-olefin oxide, and epichlorohydrin. The AOs may be used alone or in combination of two or more.

From the viewpoint of the tensile strength, the elongation, and the residual strain of the polyurethane resin, it is preferred to use THF alone, EO and THF in combination, or THF and 3M-THF in combination.

If two or more AOs are used in combination, they may be bonded by random addition, block addition, or a combination thereof.

Specific examples of the polyoxyalkylene diols (a11) include polyoxyethylene glycol, poly(oxy-1,2-propylene) glycol, polyoxytetramethylene glycol (hereinafter simply "PTMG"), polyoxy-3-methyltetramethylene glycol, THF/EO copolymer diol, and THF/3M-THF copolymer diol. Among these diols (a11), PTMG, THF/EO copolymer diol, and THF/3M-THF copolymer diol are preferred from the viewpoint of the tensile strength, the elongation, and the residual strain of the polyurethane resin.

Examples of the polyester diols (a12) include dehydration condensation-type polyester diols (a121), polylactone diols (a122), and polycarbonate diols (a123).

Examples of the dehydration condensation-type polyester diols (a121) include those obtained by condensation of a low-molecular-weight diol having a chemical formula weight or number average molecular weight of less than 500 with a dicarboxylic acid or an ester-forming derivative thereof [e.g., acid anhydrides, lower (C1-C4) alkyl esters, acid halides].

Examples of the low-molecular-weight diols having a chemical formula weight or number average molecular weight of less than 500 include the above-mentioned C2-C20 dihydric alcohols (in particular, C2-C12 aliphatic dihydric alcohols), bisphenol (e.g., bisphenol A, bisphenol S, bisphenol F) AO adducts (number average molecular weight: less than 500), dihydroxynaphthalene AO adducts (number average molecular weight: less than 500), and bis(2-hydroxyethyl) terephthalate.

Among these diols, C2-C12 aliphatic dihydric alcohols are preferred from the viewpoint of the tensile strength of the polyurethane resin. The low-molecular-weight diols having a chemical formula weight or number average molecular weight of less than 500 may be used alone or in combination of two or more.

Examples of the dicarboxylic acids or ester-forming derivatives thereof include C4-C15 aliphatic dicarboxylic acids [e.g., succinic acid, adipic acid, sebacic acid, glutaric acid, azelaic acid, maleic acid, fumaric acid], C8-C12 aromatic dicarboxylic acids [e.g., terephthalic acid, isophthalic acid], and ester-forming derivatives thereof [e.g., acid anhydrides, lower alkyl esters (e.g., dimethyl ester, diethyl ester), acid halides (e.g., acids chloride)]. Preferred among these are C4-C15 aliphatic dicarboxylic acids and ester-forming derivatives thereof. The dicarboxylic acids may be used alone or in combination of two or more thereof.

Examples of the polylactone diols (a122) include those obtained by ring-opening polymerization of a lactone monomer (e.g., γ-butyrolactone, γ-valerolactone, ε-caprolactone, mixtures of two or more thereof) using any of the above C2-C20 dihydric alcohols as an initiator.

Examples of the polycarbonate diols (a123) include polycarbonate diols obtained by condensation of one or two or more of the above C2-C12 aliphatic dihydric alcohols (preferably C3-C8, more preferably C4-C6 aliphatic dihydric alcohols) and a low-molecular-weight carbonate compound (e.g., dialkyl carbonates with a C1-C6 alkyl group, alkylene carbonates with a C2-C6 alkylene group, diaryl carbonates with a C6-C9 aryl group) while performing dealcoholization.

Among the C2-C12 aliphatic dihydric alcohols usable for the preparation of the polycarbonate diol (a123), preferred linear alcohols are 1,4-butanediol, 1,5-pentanediol, 1,6-hexanediol, and 1,9-nonanediol, and preferred branched alcohols are 3-methyl-1,5-pentanediol and 2-methyl-1,8-octanediol, from the viewpoint of the residual strain of the polyurethane resin.

Examples of the polycarbonate diols (a123) include crystalline polycarbonate diols and amorphous polycarbonate diols. Commercially available crystalline polycarbonate diols include "DURANOL T6002" [available from Asahi Kasei Chemicals Corporation], "ETERNACOLL UH-200" [available from Ube Industries, Ltd.], "NIPPOLLAN-980R" [available from Nippon Polyurethane Industry Co., Ltd.], and "Placcel CD220" [available from Daicel Corporation]. Commercially available amorphous polycarbonate diols include "PCDL G4672" [available from Asahi Kasei Chemicals Corporation], "PCDL T5652" [available from Asahi Kasei Chemicals Corporation], and "Kuraray Polyol C-2090" [available from Kuraray Co., Ltd.].

Example of the polyetherester diols (a13) include those obtained by condensation polymerization of one or more of the polyoxyalkylene diols (a11) and one or more of the dicarboxylic acids or ester-forming derivatives thereof listed above as materials of the dehydration-condensation type polyester diols.

Examples of the polybutadiene diols (a14) include those having a 1,2-vinyl structure, those having 1,4-trans structure, and those having a 1,2-vinyl structure and a 1,4-trans structure.

Other examples of the polybutadiene diols (a14) include butadiene homopolymers and butadiene copolymers (e.g., styrene-butadiene copolymers, acrylonitrile-butadiene copolymers) and hydrogenated products thereof. These hydrogenated products preferably have a hydrogenation rate of 20 to 100%.

The diol (a1) having a number average molecular weight of 500 to 10,000 preferably has a number average molecular weight of 500 or more, preferably 700 or more, still more preferably 1,000 or more, from the viewpoint of the elongation of the polyurethane resin. The number average molecular weight of the diol (a1) having a number average molecular weight of 500 to 10,000 is 10,000 or less, preferably 5,000 or less, still more preferably 4,000 or less, from the viewpoint of the tensile strength of the polyurethane resin. The number average molecular weight of the diol (a1)

having a number average molecular weight of 500 to 10,000 in the present invention can be determined from the hydroxy value measured in accordance with JIS K 0070-1992 (potentiometric titration).

In the present invention, the organic diisocyanate (b) may include an organic diisocyanate (b1) that reacts with the diol (a1) having a number average molecular weight of 500 to 10,000 and an organic diisocyanate (b2) that reacts with the chain extender (a2), described later.

The organic diisocyanates (b1) and (b2) each may be used alone or in combination of two or more.

The organic diisocyanates (b1) and (b2) may be the same as or different from each other.

Examples of the organic diisocyanate (b) usable as the organic diisocyanate (b1) or the organic diisocyanate (b2) include C8-C26 aromatic diisocyanates, C4-C22 acyclic aliphatic diisocyanates, C8-C18 alicyclic diisocyanates, C10-C18 araliphatic diisocyanates, and modified products (e.g., carbodiimide-modified products, urethane-modified products, uretdione modified products) of these diisocyanates.

Specific examples of the C8-C26 aromatic diisocyanates include 1,3-phenylene diisocyanate, 1,4-phenylene diisocyanate, 2,4-tolylene diisocyanate, 2,6-tolylene diisocyanate, 2,4'-diphenylmethane diisocyanate, 4,4'-diphenylmethane diisocyanate (hereinafter simply "MDI"), 4,4'-diisocyanatobiphenyl, 3,3'-dimethyl-4,4'-diisocyanatobiphenyl, 3,3'-dimethyl-4,4'-diisocyanatodiphenylmethane, and 1,5-naphthylene diisocyanate.

Specific examples of the C4-C22 acyclic aliphatic diisocyanates include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl)carbonate, and 2-isocyanatoethyl-2,6-diisocyanatohexanoate.

Specific examples of the C8-C18 alicyclic diisocyanates include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, 2,5-norbornane diisocyanate, and 2,6-norbornane diisocyanate.

Specific examples of the C10-C18 araliphatic diisocyanates include m-xylylene diisocyanate, p-xylylene diisocyanate, and α,α,α',α'-tetramethylxylylene diisocyanate.

Among these diisocyanates, C8-C26 aromatic diisocyanates are preferred in order to improve the tensile strength of the polyurethane resin. Specifically, MDI is particularly preferred.

Examples of the chain extender (a2) include the low-molecular-weight diols having a chemical formula weight or number average molecular weight of less than 500 listed above as materials of the dehydration condensation-type polyester diols (a121), water, C2-C10 diamines (e.g., ethylenediamine, propylenediamine, hexamethylenediamine, isophoronediamine, toluenediamine, piperazine), poly(n=2 to 6)alkylene(having 2 to 6 carbon atoms)poly(n=3 to 7)amines (e.g., diethylenetriamine, triethylenetetramine), hydrazine or derivatives thereof (e.g., dibasic acid dihydrazides such as adipic acid dihydrazide), and C2-C10 aminoalcohols (e.g., ethanolamine, diethanolamine, 2-amino-2-methylpropanol, triethanolamine).

Among these chain extenders, low-molecular-weight diols having a chemical formula weight or number average molecular weight of less than 500 are preferred, and C2-C12 aliphatic dihydric alcohols are more preferred, from the viewpoint of the residual strain, the tensile strength, and the elongation of the polyurethane resin. Specifically, ethylene glycol, diethylene glycol, 1,3-propanediol, and 1,4-butanediol are preferred. In particular, ethyleneglycol, 1,3-propanediol, and 1,4-butanediol are still more preferred.

The amount of the chain extender (a2) to be used is preferably 0.1 to 10 times the number of moles of the diol (a1) having a number average molecular weight of 500 to 10,000 from the viewpoint of the heat resistance, the tensile strength, and the residual strain of the polyurethane resin. The chain extenders (a2) may be used alone or in combination of two or more.

The total concentration of urethane groups and urea groups in the polyurethane resin of the present invention is 1.25 to 2.50 mmol/g based on the weight of the polyurethane resin. If the total concentration of urethane groups and urea groups is less than 1.25 mmol/g, the tensile strength is lowered. If the total concentration of these groups is more than 2.50 mmol/g, the residual strain is increased, and the elongation is lowered.

From the viewpoint of the residual strain of the polyurethane resin, the total concentration of these groups is preferably 1.55 to 2.30 mmol/g, more preferably 1.75 to 2.20 mmol/g.

The total concentration of urethane groups and urea groups in the polyurethane resin of the present invention is calculated by theoretical calculation of the total mole ratio of the diol (a1) having a number average molecular weight of 500 to 10,000 and the chain extender (a2), and the total mole ratio of the organic diisocyanates (b).

The hard segment domains of the polyurethane resin of the present invention have an average domain size of 20 to 30 nm as measured with an atomic force microscope (hereinafter simply "AFM").

If the hard segment domains have an average domain size of less than 20 nm, the heat resistance is lowered. The average domain size of the hard segment domains is preferably 21 to 29 nm, more preferably 21.5 to 28.0 nm, from the viewpoint of the heat resistance, the tensile strength, and the elongation of the polyurethane resin.

The hard segment domain of the polyurethane resin herein refers to a domain that shows a phase shift of 0 to 50% as measured with an atomic force microscope. The hard segment domain is a block (B2) including the chain extender (a2) and the organic diisocyanate (b2) that reacts with the chain extender (a2).

The term "average domain size of the hard segment domains" means the average size of the blocks (B2) that show a phase shift of 0 to 50% as measured with an AFM.

<Method of Measuring Phase Shift with AFM>

The phase shift is determined with an AFM by tapping the surface of the polyurethane resin with a cantilever to measure the phase shift of the cantilever. A small phase shift occurs in a hard portion of the resin, whereas a large phase shift occurs in a soft portion. The results of the phase shift measurement are image-processed, whereby the hard segment domains, defined as above, are represented as a specific domain size. This domain size is calculated using an image-processing software.

The detection limit of this measurement method for the average domain size of the hard segment domains is around 5 nm.

<Method of Measuring Average Domain Size of Hard Segments with AFM>

The average domain size of the hard segment domains can be measured with an AFM under the following conditions.

(Method of Preparing Sample)

The polyurethane resin is cut into a size that can be placed on the sample stage. The cut polyurethane resin is fixed on the sample stage with double-stick tape.

(Measurement Conditions)

Measurement device: atomic force microscope SPI4000 Nano Navi Station (available from SII NanoTechnology Inc.)

Cantilever: OMCL-AC240TS-R3

Measurement unit: E-sweep

Scan mode: phase image (Method of Measuring Average Domain Size)

An image obtained using an atomic force microscope is subjected to an image analysis using the following software.

Measurement software: WinROOF (available from Mitani Corporation)

The detection limit of this measurement method for the average domain size of the hard segment domains is around 5 nm.

The polyurethane resin may include a block (B1) and a block (B2).

In the polyurethane resin of the present invention, the block (B1) may include the diol (a1) having a number average molecular weight of 500 to 10,000 and the organic diisocyanate (b1) that reacts with the diol (a1) having a number average molecular weight of 500 to 10,000.

From the viewpoint of heat resistance, the tensile strength, and the elongation of the polyurethane resin, the block (B1) preferably has a number average molecular weight ($M_{B1}$) of 4,000 to 80,000 as calculated by Formula (1).

$$M_{B1} = \frac{k \times M_{a1} + r \times M_{b1}}{r - k} - M_{b1} \times 2 \qquad (1)$$

In Formula (1), $M_{a1}$ represents the number average molecular weight of the diol (a1) having a number average molecular weight of 500 to 10,000; $M_{b1}$ represents the number average molecular weight of the organic diisocyanate (b1); k represents the number of moles of the diol (a1) having a number average molecular weight of 500 to 10,000; and r represents the number of moles of the organic diisocyanate (b1).

In the polyurethane resin, the block (B2) may include the chain extender (a2) and the organic diisocyanate (b2) that reacts with the chain extender (a2).

From the viewpoint of heat resistance, the tensile strength, and the elongation of the polyurethane resin, the block (B2) preferably has a number average molecular weight ($M_{B2}$) of 1,400 to 25,000 as calculated by Formula (2).

$$M_{B2} = \frac{i \times M_{a2} + j \times M_{b2}}{i - j} + M_{b2} \times 2 \qquad (2)$$

In Formula (2), $M_{a2}$ represents the number average molecular weight of the chain extender (a2); $M_{b2}$ represents the number average molecular weight of the organic diisocyanate (b2); i represents the number of moles of the chain extender (a2); and j represents the number of moles of the organic diisocyanate (b2).

From the viewpoint of heat resistance, the tensile strength, and the elongation of the polyurethane resin, the block (B1) more preferably has a number average molecular weight ($M_{B1}$) of 4,200 to 70,000, particularly preferably 4,500 to 65,000, as calculated by Formula (1).

From the viewpoint of heat resistance, the tensile strength, and the elongation of the polyurethane resin, the block (B2) more preferably has a number average molecular weight ($M_{B2}$) of 1,450 to 22,000, particularly preferably 1,475 to 20,000, as calculated by Formula (2).

The polyurethane resin of the present invention preferably satisfies the following requirements (1) to (3).

(1) The ratio of the number of moles of the diol (a1) having a number average molecular weight of 500 to 10,000 to the number of moles of an organic diisocyanate (b1) that reacts with the diol (a1) having a number average molecular weight of 500 to 10,000 is preferably as follows: The ratio diol (a1) having a number average molecular weight of 500 to 10,000:organic diisocyanate (b1) is 1:1.05 to 1:1.5.

The ratio is more preferably 1:1.05 to 1:1.4, particularly preferably 1:1.05 to 1.3.

(2) The total number of moles of the organic diisocyanate (b1) and an organic diisocyanate (b2) that reacts with the chain extender (a2) is preferably 1.3 to 4.2 times, more preferably 2.0 to 3.4 times, particularly preferably 2.4 to 3.0 times the number of moles of the diol (a1) having a number average molecular weight of 500 to 10,000.

(3) The total number of moles of the diol (a1) having a number average molecular weight of 500 to 10,000 and the chain extender (a2) is equal to the total number of moles of the organic diisocyanate (b1) and the organic diisocyanate (b2).

The polyurethane resin of the present invention preferably has a number average molecular weight of 20,000 to 200,000, more preferably 30,000 to 190,000, particularly preferably 40,000 to 180,000, from the viewpoint of the tensile strength.

The number average molecular weight of the polyurethane resin of the present invention can be measured by gel permeation chromatography under the following conditions, for example.

Device: "HLC-8220GPC" (available from Tosoh Corporation)

Column: one "Guard column α" and one "TSKgel α-M" (each available from Tosoh Corporation]

Sample solution: 0.125% by weight dimethylformamide solution

Solution injection amount: 100 μL

Flow rate: 1 mL/min

Measurement temperature: 40° C.

Detector: refractive index detector

Standard: standard polystyrene

The polyurethane resin of the present invention preferably has a thermal softening point of 180° C. to 280° C., more preferably 185° C. to 260° C., particularly preferably 190° C. to 240° C., from the viewpoint of the heat resistance of the polyurethane resin.

The thermal softening point of the polyurethane resin of the present invention can be measured by the following method.

[1] Method of Preparing Film

A solution of the polyurethane resin is applied to a release-treated glass plate to a thickness of 1.0 mm and dried at 70° C. for three hours with a wind-circulation dryer. Thereafter, the dried layer is peeled off from the glass plate to provide a film with a thickness of about 0.2 mm.

[2] Measurement Method

A specimen (length 10 mm×width 10 mm) is cut out from the film obtained above. In accordance with JIS K 7196, the temperature of the specimen is raised from room temperature to 300° C. at 5° C./min and the thermal softening point is measured. TMA/SS6100 (available from SII) can be used for the measurement.

The method of producing the polyurethane resin of the present invention includes the step of reacting an isocyanate group-containing urethane prepolymer (p), the organic diisocyanate (b2), and the chain extender (a2), wherein the isocyanate group-containing urethane prepolymer (p) is obtained by reacting the diol (a1) having a number average molecular weight of 500 to 10,000 and the organic diisocyanate (b1). This method satisfies the following requirements (1) to (3).

(1) The ratio of the number of moles of the diol (a1) having a number average molecular weight of 500 to 10,000 to the number of moles of the organic diisocyanate (b1) is as follows: The ratio diol (a1) having a number average molecular weight of 500 to 10,000:organic diisocyanate (b1) is 1:1.05 to 1:1.5.

(2) The total number of moles of the organic diisocyanate (b1) and the organic diisocyanate (b2) is 1.3 to 4.2 times the number of moles of the diol (a1) having a number average molecular weight of 500 to 10,000.

(3) The total number of moles of the diol (a1) having a number average molecular weight of 500 to 10,000 and the chain extender (a2) is equal to the total number of moles of the organic diisocyanate (b1) and the organic diisocyanate (b2).

From the viewpoint of the heat resistance and the residual strain of the polyurethane resin, when the diol (a1) having a number average molecular weight of 500 to 10,000 is reacted with the organic diisocyanate (b1) to prepare the urethane prepolymer (p), the ratio of the number of moles of the hydroxy groups of the diol (a1) having a number average molecular weight of 500 to 10,000 to the number of moles of the isocyanate groups of the organic diisocyanate (b1) is preferably as follows: The ratio hydroxy group:isocyanate group is 1:1.05 to 1:1.5. The ratio is more preferably 1:1.05 to 1:1.4, particularly preferably 1:1.05 to 1.3.

When the diol (a1) having a number average molecular weight of 500 to 10,000 is reacted with the organic diisocyanate (b1), the conditions such as the temperature or time may be the same as those employed in preparation of usual urethane prepolymers.

The method of producing the polyurethane resin of the present invention includes reacting the urethane prepolymer (p), the organic diisocyanate (b2), and the chain extender (a2) to prepare a polyurethane resin. The conditions such as the temperature or time in this reaction may be the same as those employed in preparation of usual urethane prepolymers. The organic diisocyanate (b1) to be used for the preparation of the urethane prepolymer (p) and the organic diisocyanate (b2) to be reacted with the urethane prepolymer (p) may be the same as or different from each other.

From the viewpoint of the tensile strength and the residual strain of the polyurethane resin, the total number of moles of the isocyanate groups of the organic diisocyanate (b1) and the isocyanate groups of the organic diisocyanate (b2) is preferably 1.3 to 4.2 times, more preferably 2.0 to 3.4 times, particularly preferably 2.4 to 3.0 times the number of moles of the hydroxy groups of the diol (a1) having a number average molecular weight of 500 to 10,000.

From the viewpoint of the tensile strength of the polyurethane resin, the total number of moles of the hydroxy groups of the diol (a1) having a number average molecular weight of 500 to 10,000 and the hydroxy groups of the chain extender (a2) is equal to the total number of moles of the isocyanate groups of the organic diisocyanate (b1) and the isocyanate groups of the organic diisocyanate (b2).

The polyurethane resin can be obtained by reacting the urethane prepolymer (p), the organic diisocyanate (b2), and the chain extender (a2), as mentioned above. Preferably, an end-capping agent (a3) is added during the reaction of the urethane prepolymer (p), the organic diisocyanate (b2), and the chain extender (a2) so as to terminate the extending reaction by capping the ends of the polymer.

Examples of the end-capping agent (a3) include C1-C18 monoalcohols (a31) and C2-C20 monoamines (a32). The end-capping agents (a3) may be used alone or in combination of two or more.

Examples of the C1-C18 monoalcohols (a31) include linear monools (e.g., methanol, ethanol, n-propanol, n-butanol, pentanol, hexanol, octanol, nonyl alcohol, decyl alcohol, undecyl alcohol, dodecyl alcohol, tridecyl alcohol, tetradecyl alcohol, hexadecyl alcohol, octadecyl alcohol); branched chain-containing monools (e.g., isopropanol, sec-, iso- or tert-butanol, neopentyl alcohol, 3-methyl-pentanol, 2-ethylhexanol); C6-C10 cyclic group-containing monools [e.g., alicyclic group-containing monools (e.g., cyclohexanol) and aromatic ring-containing monools (e.g., benzyl alcohol)]; polymer monools (e.g., polyester monool, polyether monool, polyetherester monool); cellosolves; carbitols; and mixtures of two or more thereof.

Among these monoalcohols, linear monools are preferred. Specifically, methanol, ethanol, n-propanol, n-butanol, and the like are preferred.

Examples of the C2-C20 monoamines (a32) include mono- or dialkylamines containing a C1-C8 alkyl group such as ethylamine, n-propylamine, isopropylamine, n-butylamine, diethylamine, di-n-propylamine, diisopropylamine, and di-n-butylamine; C6-C10 alicyclic monoamine such as cyclohexylamine; C6-C10 aromatic monoamines such as aniline; mono- or dialkanolamines containing C2-C4 alkanol group such as monoethanolamine, monoisopropanolamine, diethanolamine, diisopropanolamine; heterocyclic monoamines such as morpholine; and mixtures of two or more thereof.

For the termination of the extending reaction by capping the ends of the polymer, the end-capping agent (a3) is preferably added when the weight proportion of isocyanate groups reaches 0.01 to 0.3% by weight in the reaction mixture containing the urethane prepolymer (p), the organic diisocyanate (b2), and the chain extender (a2). More preferably, the end-capping agent (a3) is added when the weight proportion of the isocyanate groups reaches 0.03 to 0.13% by weight.

If an organic solvent or an additive (described later) is used in the preparation of the polyurethane resin, it is difficult to directly determine the weight proportion of the isocyanate groups in the reaction mixture containing the urethane prepolymer (p), the organic diisocyanate (b2), and the chain extender (a2). In this case, the ratio of the total amount of the urethane prepolymer (p), the organic diisocyanate (b2), and the chain extender (a2) to the total amount of the reaction mixture is multiplied by the above-mentioned weight proportion range of isocyanate groups, so as to determine a target range of the weight proportion of isocyanate groups for the addition of the end-capping agent (a3). The end-capping agent (a3) is added when the measured value of the isocyanate group-content of the reaction mixture containing an organic solvent and other components reaches the target range.

The conditions in the termination of the extending reaction such as temperature or time may be the same as those employed in the termination of the extending reaction in preparation of a usual polyurethane resin.

In the method of producing the polyurethane resin of the present invention, an organic solvent may be used in any production steps. Any organic solvent may be used. Examples thereof include C3-C10 ketone solvents (e.g., acetone, methyl ethyl ketone, methyl isobutyl ketone), C2-C10 ester solvents (e.g., ethyl acetate, butyl acetate, γ-butyrolactone), C4-C10 ether solvents (e.g., tetrahydrofuran, diethylene glycol dimethyl ether), C3-C10 amide solvents [e.g., N,N-dimethylformamide, N,N-dimethylacetamide (hereinafter simply "DMAC"), N-methyl-2-pyrolidone, N-methylcaprolactam], C2-C10 sulfoxide solvents (e.g., dimethyl sulfoxide), C1-C8 alcohol solvents (e.g., methanol, ethanol, isopropyl alcohol, octanol), and C4-C10 hydrocarbon solvents (e.g., n-butane, cyclohexane, toluene, xylene).

Among these organic solvents, C3-C10 amide solvents and C2-C10 sulfoxide solvents are preferred, and C3-C10 amide solvents are more preferred, from the viewpoint of the solubility of the polyurethane resin. Specifically, N,N-dimethylformamide and DMAC are more preferred.

If an organic solvent is used, the amount thereof is preferably such that the concentration of the polyurethane resin to be obtained is 10 to 90% by weight, more preferably 20 to 80% by weight.

In the preparation of the polyurethane resin, a catalyst that is usually used in production of a polyurethane resin may be optionally used in order to promote the reaction. Specific examples of the catalyst include organic metal compounds [e.g., dibutyltin dilaurate, dioctyltin laurate, bismuth carboxylate, bismuth alkoxides, chelate compounds formed from dicarbonyl group-containing compounds and bismuth], inorganic metal compounds [e.g., bismuth oxide, bismuth hydroxide, bismuth halides], amines [e.g., triethylamine, triethylenediamine, diazabicycloundecene], and any combination of two or more thereof.

Furthermore, a pigment, a stabilizer, and other additives (e.g., a fusion inhibitor, a flame retardant) may be added in any step in the method of producing the polyurethane resin of the present invention. The polyurethane resin composition thus produced using an additive is the polyurethane resin composition of the present invention containing the polyurethane resin of the present invention and an additive.

Any pigment may be used. An organic pigment and/or an inorganic pigment known in the art may be used. The amount of the pigment to be used is usually 0 to 5% by weight, preferably 0.1 to 3% by weight based on the weight of the polyurethane resin to be obtained. Examples of the organic pigment include insoluble azo pigments, soluble azo pigments, copper phthalocyanine pigments, and quinacridone pigments. Examples of the inorganic pigment include chromates, ferrocyanides, metal oxides, selenium sulfide compounds, metal salts (e.g., sulfates, silicates, carbonates, phosphates), metal powder, and carbon black.

Any stabilizer may be used. An antioxidant and/or an ultraviolet absorber known in the art may be used. The amount of the stabilizer to be used is usually 0 to 5% by weight, preferably 0.1 to 3% by weight based on the weight of the polyurethane resin to be obtained.

Examples of the antioxidant include phenolic antioxidants [e.g., 2,6-di-t-butyl-p-cresol, butylated hydroxyanisole]; bisphenolic antioxidants [e.g., 2,2'-methylenebis(4-methyl-6-t-butylphenol)]; and phosphoric antioxidants [e.g., triphenylphosphite, diphenylisodecylphosphite].

Examples of ultraviolet absorbers include benzophenone ultraviolet absorbers [e.g., 2,4-dihydroxybenzophenone, 2-hydroxy-4-methoxybenzophenone]; benzotriazole ultraviolet absorbers [e.g., 2-(2'-hydroxy-5'-methylphenyl)benzotriazole]; salicylic acid ultraviolet absorbers [e.g., phenyl salicylate]; and hindered amine ultraviolet absorbers [e.g., bis(2,2,6,6-tetramethyl-4-piperidyl) sebacate].

The polyurethane resin and polyurethane resin composition of the present invention have high heat resistance and are excellent in stretching physical properties such as the tensile strength and the elongation. They are thus suitably used as elastic fibers.

If the polyurethane resin or the polyurethane resin composition of the present invention is used for elastic fibers, melt spinning or dry spinning may be employed. If the resin or the resin composition is used by melt spinning, the resin or the resin composition may be used in a molten form, in a solvent-free pellet from, or in a solvent-free block form. If the polyurethane resin or the polyurethane resin composition is used by dry spinning, the resin or the resin composition may be used in the form of a polyurethane resin solution that usually has a resin concentration of 30 to 80% by weight. The solution is prepared by dilution with any of the above-mentioned solvents, such as DMCA.

The polyurethane elastic fibers obtained by spinning the polyurethane resin or the polyurethane resin composition of the present invention can be obtained by, for example, dry spinning, wet spinning, or melt spinning using the above polyurethane resin solution as a spinning dope, and winding the resulting fibers. In particular, dry spinning is preferred because elastic fibers obtained by dry spinning can have large hard segment domain crystals, so that they can exhibit high breaking elongation, high thermal softening point, excellent chemical resistance, low coefficient of variation of the fineness, and also because fibers of any fineness can be stably spun.

The polyurethane elastic fibers obtained by spinning the polyurethane resin or the polyurethane resin composition of the present invention may have any fineness or any cross-sectional shape. For example, the polyurethane elastic fibers may have a circular cross-sectional shape or a flat cross-sectional shape.

The dry spinning method is not limited. Spinning conditions are appropriately selected according to desired characteristics or spinning equipment.

For example, the permanent strain and the stress relaxation of polyurethane elastic fibers are preferably appropriately determined according to the applications of the elastic fibers, because these properties are especially susceptible to the speed ratio of a godet roller to a winder. In order to obtain polyurethane elastic fibers with desired permanent strain and stress relaxation, winding is preferably performed at a speed ratio of a godet roller to a winder of 1.10 or more but 1.65 or less. In particular, in order to obtain polyurethane elastic fibers with high permanent strain and low stress relaxation, the speed ratio of a godet roller to a winder is more preferably 1.15 or more but 1.4 or less, still more preferably 1.15 or more but 1.35 or less.

In order to obtain polyurethane elastic fibers with low permanent strain and high stress relaxation, winding is preferably performed at a speed ratio of a godet roller to a winder of 1.25 or more but 1.65 or less, more preferably 1.35 or more but 1.65 or less.

The spinning rate is preferably 450 m/min or more in order to improve the strength of the polyurethane elastic fibers to be obtained.

The polyurethane elastic fibers obtained in the above-described manner are used to produce a fabric, for example, in combination with other fibers. Examples of other fibers to be used with the polyurethane elastic fibers for fabric production include polyamide fibers and polyester fibers.

Such other fibers to be used in combination with the polyurethane elastic fibers are preferably filaments in order to produce a fabric with good appearance reflecting the high heat-setting properties and the low coefficient of variation of the fineness of the polyurethane elastic fibers.

The polyamide fibers are fibers exemplified by, but not limited to, nylon 6 fibers or nylon 66 fibers. The polyester fibers are fibers made of polyesters. Examples of the polyesters include polyethylene terephthalate, polytrimethylene terephthalate, polytetramethylene terephthalate, ester copolymers mainly consisting of polytetramethylene glycol and ethylene glycol as diol components, and cationic-dyeable polyesters obtained by modifying these polyesters.

A fabric made from the polyurethane elastic fibers obtained by spinning the polyurethane resin or the polyurethane resin composition of the present invention preferably contains the above polyamide fibers or the above polyester fibers, from the viewpoint of the processability and the durability of the fabric. The fabric may contain synthetic fibers such as polyacrylic fibers and polyvinyl chloride fibers, regenerated cellulose fibers such as cuprammonium rayon, viscose rayon, and purified cellulose, regenerated protein fibers, semisynthetic fibers, or natural fiber materials such as cotton, silk, and wool.

The polyurethane elastic fibers in the fabric may be in the form of a bare yarn or in the form of a conjugated yarn, such as a core spun yarn in which the polyurethane elastic fibers are covered with other fibers, an air covered yarn in which the polyurethane elastic fibers are covered with other fibers, a plied yarn with other fibers, a twisted union yarn with other fibers, and an interlaced yarn with other fibers. The fabric containing the polyurethane elastic fibers and other fibers may be a knitted fabric containing any of the above conjugated yarns. Alternatively, the fabric may be produced by knitting the polyurethane elastic fibers in combination with other fibers by warp knitting, circular knitting, weft knitting, or the like.

If the fabric is a knitted fabric, it may be a warp knitted fabric or a weft knitted fabric. Examples thereof include tricot, raschel, and circular knitted fabrics. The knitting structure may be any knitting structure, such as half stitch, back half stitch, double atlas stitch, or double denbigh stitch. From the viewpoint of the texture, the surface of the knitted fabric preferably contains natural fibers, chemical fibers, or synthetic fibers other than polyurethane elastic fibers.

The polyurethane resin and the polyurethane resin composition of the present invention have high heat resistance and excellent stretching physical properties such as the tensile strength and the elongation. They thus can be suitably used as various films.

The polyurethane resin and the polyurethane resin composition of the present invention have high heat resistance and excellent stretching properties. They thus can be suitably used in materials for elastomers such as paints, coating agents, sealing materials, adhesives, fiber processing agents, artificial or synthetic leathers, and rolls, and fiber products such as elastic fibers.

EXAMPLES

The present invention will be further described with reference to examples. The present invention is not limited to the examples.

Examples 1 to 9 and Comparative Examples 3 and 4

In accordance with the formulation shown in Table 1, a reaction container equipped with a stirring device and a temperature control device was charged with a diol (a1) having a number average molecular weight of 500 to 10,000, an organic diisocyanate (b1), and an organic solvent. These compounds were reacted under a nitrogen atmosphere at 70° C. for seven hours. Thus, a urethane prepolymer (p) was obtained. Subsequently, a chain extender (a2) and an organic diisocyanate (b2) were added to the reaction container. These compounds were reacted under a nitrogen atmosphere at 70° C. When the weight proportion of isocyanate groups in the reaction mixture reached the value shown in Table 2 or 3, an end-capping agent (a3) was added to the reaction mixture, so as to terminate the extending reaction by capping the ends of the polymer. The capping reaction was performed for one hour. In this manner, polyurethane resin solutions (P-1) to (P-9) of Example 1 to 9 and polyurethane resin solutions (R-3) and (R-4) of Comparative Examples 3 and 4 were obtained.

Comparative Examples 1 and 2

In accordance with the formulation shown in Table 1, a reaction container equipped with a stirring device and a temperature control device was charged with a diol (a1) having a number average molecular weight of 500 to 10,000, a chain extender (a2), organic diisocyanates (b1) and (b2) (Table 1 shows the total amount of diisocyanates added.) and an organic solvent. These compounds were reacted under a dry nitrogen atmosphere at 70° C. When the weight proportion of isocyanate groups in the reaction mixture reached the value shown in Table 3, an end-capping agent (a3) was added to the reaction mixture so as to terminate the extending reaction by capping the ends of the polymer. The capping reaction was performed for one hour. In this manner, polyurethane resin solutions (R-1) and (R-2) of Comparative Examples 1 and 2 were obtained.

The diols (a1) having a number average molecular weight of 500 to 10,000 listed in Table 1 have the following compositions.

PTMG1500: polyoxytetramethylene glycol having a number average molecular weight of 1,500 ["PTMG1500", available from Mitsubishi Chemical Corporation]

PTMG2000: polyoxytetramethylene glycol having a number average molecular weight of 2,000 ["PTMG2000", available from Mitsubishi Chemical Corporation]

PTMG3000: polyoxytetramethylene glycol having a number average molecular weight of 3,000 ["PTMG3000", available from Mitsubishi Chemical Corporation]

THF/EO copolymer: tetrahydrofuran/ethylene oxide copolymer diol having a number average molecular weight of 2,000 and a mole ratio of THF to EO of 70:30

THF/3M-THF copolymer: tetrahydrofuran/3-methyltetrahydrofuran copolymer diol having a number average molecular weight of 2,000 ["PTGL2000", available from Hodogaya Chemical Co., Ltd.]

SANESTOR 24625: dehydration condensation-type polyester diol having a number average molecular weight of 2,500 ["SANESTOR 24625", available from Sanyo Chemical Industries, Ltd.]

[3] Method of Measuring Residual Strain

A strip-shaped specimen (length 100 mm×width 5 mm) was cut out of the film obtained above. The specimen was marked with bench marks such that the gauge length was 50 mm. This specimen was set in the chucks of an Instron tensile tester (autograph, available from Shimadzu Corp.). The specimen was stretched at a 25° C. atmosphere at a constant rate of 500 rum/min until the gauge length reached 300%, and then the specimen was allowed to return at the same rate so that the inter-chuck distance reached its value before the stretching.

TABLE 1

| | | | | Example | | | | | | |
|---|---|---|---|---|---|---|---|---|---|---|
| Polyurethane resin solution | | | | 1 (P-1) | 2 (P-2) | 3 (P-3) | 4 (P-4) | 5 (P-5) | 6 (P-6) | 7 (P-7) |
| Constituent unit (parts by weight) | Diol (a1) having a number average molecular weight of 500 to 10000 | Polyoxyalkylene diol (a11) | PTMG1500 | — | — | — | — | — | 214 | — |
| | | | PTMG2000 | 213 | 213 | 213 | 213 | — | — | — |
| | | | PTMG3000 | — | — | — | — | 211 | — | — |
| | | | THF/EO copolymer | — | — | — | — | — | — | 213 |
| | | | THF/3M-THF copolymer | — | — | — | — | — | — | — |
| | | Polyester diol (a12) | SANESTOR 24625 | — | — | — | — | — | — | — |
| | Chain extender (a2) | | Ethylene glycol | 12 | 12 | 12 | 12 | 14 | 9 | 12 |
| | End-capping agent (a3) | | n-Butanol | 5 | 5 | 5 | 5 | 3 | 6 | 5 |
| | Organic diisocyanate (b1) | | MDI | 28 | 32 | 35 | 40 | 19 | 38 | 28 |
| | Organic diisocyanate (b2) | | MDI | 45 | 41 | 38 | 33 | 55 | 35 | 45 |
| | Organic solvent | | DMAC | 698 | 698 | 698 | 698 | 699 | 698 | 698 |
| Total (parts by weight) | | | | 1000 | 1000 | 1000 | 1000 | 1000 | 1000 | 1000 |

| | | | | Example | | Comparative Example | | | |
|---|---|---|---|---|---|---|---|---|---|
| Polyurethane resin solution | | | | 8 (P-8) | 9 (P-9) | 1 (R-1) | 2 (R-2) | 3 (R-3) | 4 (R-4) |
| Constituent unit (parts by weight) | Diol (a1) having a number average molecular weight of 500 to 10000 | Polyoxyalkylene diol (a11) | PTMG1500 | — | — | — | — | — | — |
| | | | PTMG2000 | — | — | 216 | 190 | 213 | 170 |
| | | | PTMG3000 | — | — | — | — | — | — |
| | | | THF/EO copolymer | — | — | — | — | — | — |
| | | | THF/3M-THF copolymer | 213 | — | — | — | — | — |
| | | Polyester diol (a12) | SANESTOR 24625 | — | 212 | — | — | — | — |
| | Chain extender (a2) | | Ethylene glycol | 12 | 13 | 12 | 18 | 12 | 21 |
| | End-capping agent (a3) | | n-Butanol | 5 | 4 | 4 | 4 | 5 | 4 |
| | Organic diisocyanate (b1) | | MDI | 28 | 22 | 74 | 94 | 45 | 22 |
| | Organic diisocyanate (b2) | | MDI | 45 | 51 | — | — | 28 | 84 |
| | Organic solvent | | DMAC | 698 | 699 | 693 | 695 | 698 | 699 |
| Total (parts by weight) | | | | 1000 | 1000 | 1000 | 1000 | 1000 | 1000 |

With the polyurethane resin solutions obtained in Examples 1 to 9 and Comparative Examples 1 to 4, the tensile strength at break, the elongation at break, the residual strain, and the thermal softening point were measured by the following methods. The results are shown in Table 2.

[1] Method of Preparing Film

The polyurethane resin solution was applied to a release-treated glass plate to a thickness of 1.0 mm and dried at 70° C. for three hours with a wind-circulation dryer. Thereafter, the dried resin was peeled off from the glass plate. Thus, a film with a thickness of about 0.2 mm was prepared.

[2] Method of Measuring Strength and Elongation of Film

The film obtained above was allowed to stand for one hour in a room with a controlled temperature of 25° C. and a controlled humidity of 65% RH. Thereafter, the tensile strength at break and the elongation at break were measured in accordance with JIS K 6251. The greater these values are, the better the elastic fiber performance is. The parallel portion of the dumbbell specimen was 200 μm in thickness and 5 mm in width. The initial gauge length was 20 mm.

The gauge length (D1) after this operation was measured. The residual strain (%) was determined by the following formula using the value (D1) and the gauge length before the test (D0=50 mm).

Residual strain (%)={(D1−D0)/D0}×100

[4] Measurement of Thermal Softening Point

A strip-shaped specimen (length 100 mm×width 5 mm) was cut out of the film obtained above. In accordance with JIS K 7196, the temperature of the specimen was raised from room temperature to 300° C. at 5° C./min and the thermal softening point was measured. TMA/SS6100 (available from SII) was used for the measurement.

The higher the thermal softening point is, the better heat resistance the polyurethane resin has.

[5] Method of Measuring Average Domain Size of Hard Segment Domains with AFM (Method of Preparing Sample)

The polyurethane resin was cut to a size that could be placed on the sample stage. The cut polyurethane resin was fixed to the sample stage with double-stick tape.

Figure 1:
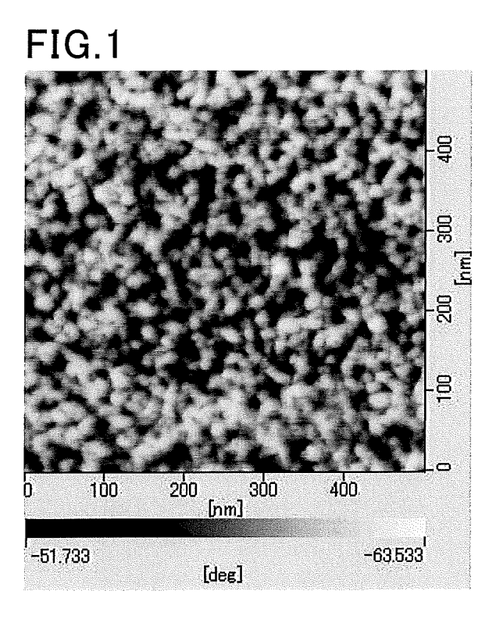
FIG. 1 is an image of hard segment domains in Example 2.
Figure 2:
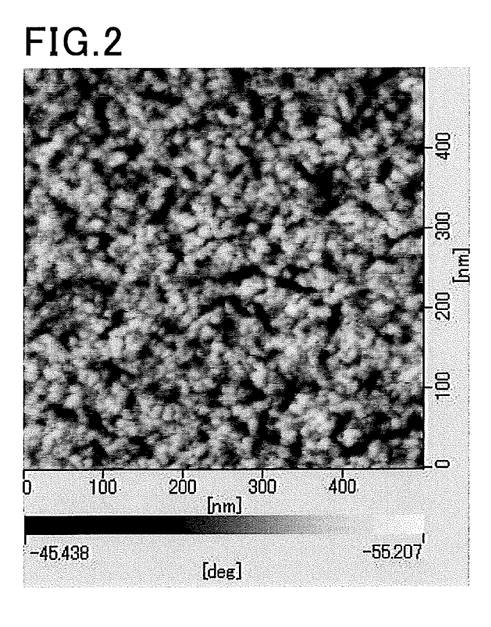
FIG. 2 is an image of hard segment domains in Comparative Example 1.

(Measurement Conditions)
Device: atomic force microscope SPI4000 Nano Navi Station (available from SII NanoTechnology Inc.)
Cantilever: OMCL-AC240TS-R3
Measurement unit: E-sweep
Scan mode: phase image
(Method of Measuring Average Domain Size)
An image measured with an atomic force microscope was subjected to image analysis using the following software.
Measurement software: WinROOF (available from Mitani Corporation)
FIGS. 1 and 2 are images of hard segment domains in Examples 2 and Comparative Example 1.
FIG. 1 is an image of hard segment domains in Example 2.
A gray scale bar in the lower part of FIG. 1 shows the degree of the phase shift of the cantilever. The left half of the bar, i.e., the dark portion, corresponds to a phase shift of 0 to 50%. Domains displayed in the dark color are hard segment domains in Example 2.
FIG. 2 is an image of hard segment domains in Comparative Example 1. The interpretation of FIG. 2 is the same as that of FIG. 1.
Table 2 shows the average domain size of the hard segment domains, the urethane group concentration and the urea group concentration of the polyurethane resin, the number average molecular weight of the block (B1), the number average molecular weight of the block (B2), and the number average molecular weight of the polyurethane resin.
[6] Method of Calculating Urethane Group Concentration and Urea Group Concentration
These concentrations were calculated by theoretical calculation of the total mole ratio of the diol (a1) having a number average molecular weight of 500 to 10,000 and the chain extender (a2) and the total mole ratio of the organic diisocyanates (b).
Table 2 shows the total concentration of urethane groups and urea groups.
[7] Method of Calculating Number Average Molecular Weight of Blocks (B1) and (B2)
The number average molecular weight ($M_{B1}$) was calculated by Formula (1) based on the block (B1) including the diol (a1) having a number average molecular weight of 500 to 10,000 and the organic diisocyanate (b1) that reacts with the diol (a1) having a number average molecular weight of 500 to 10,000.

$$M_{B1} = \frac{k \times M_{a1} + r \times M_{b1}}{r - k} - M_{b1} \times 2 \quad (1)$$

In Formula (1), $M_{a1}$ represents the number average molecular weight of the diol (a1) having a number average molecular weight of 500 to 10,000; $M_{b1}$ represents the number average molecular weight of the organic diisocyanate (b1); k represents the number of moles of the diol (a1) having a number average molecular weight of 500 to 10,000; and r represents the number of moles of the organic diisocyanate (b1).

The number average molecular weight ($M_{B2}$) was calculated by Formula (2) based on the block (B2) including the chain extender (a2) and the organic diisocyanate (b2) that reacts with the chain extender (a2).

$$M_{B2} = \frac{i \times M_{a2} + j \times M_{b2}}{i - j} + M_{b2} \times 2 \quad (2)$$

In Formula (2), $M_{a2}$ represents the number average molecular weight of the chain extender (a2); $M_{b2}$ represents the number average molecular weight of the organic diisocyanate (b2); i represents the number of moles of the chain extender (a2), and j represents the number of moles of the organic diisocyanate (b2).

Table 2 shows the number average molecular weight of the block (B1) and the number average molecular weight of the block (B2).
[8] Method of Measuring Number Average Molecular Weight of Polyurethane Resin
The number average molecular weight of the polyurethane resin was measured by gel permeation chromatography under the following conditions.
Device: "HLC-8220GPC" (available from Tosoh Corporation)
Column: one "Guard column α" and one "TSKgel α-M" (each available from Tosoh Corporation
Sample solution: 0.125% by weight dimethylformamide solution
Solution injection amount: 100 μL
Flow rate: 1 mL/min
Measurement temperature: 40° C.
Detector: refractive index detector
Standard: standard polystyrene
Table 2 shows the number average molecular weight of the polyurethane resin.
Polyurethane elastic fibers (L-1) to (L-9) and (L'-1) to (L'-4) were prepared by the method below using the polyurethane resin solutions obtained in Examples 1 to 9 and Comparative Examples 1 to 4. The breaking elongation, the breaking strength, the permanent strain, the stress relaxation, the thermal softening point, the heat setting, the chemical resistance, and the coefficient of variation of the fineness of the polyurethane elastic fibers were measured. The results are shown in Table 3.
[9] Method of Preparing Polyurethane Elastic Fibers (L-1) to (L-9) and (L'-1) to (L'-4)
Polyurethane disclosed in U.S. Pat. No. 3,555,115, prepared by reacting t-butyldiethanolamine and methylenebis-(4-cyclohexylisocyanate), was mixed with a condensation polymer of p-cresol and divinylbenzene disclosed in U.S. Pat. No. 3,553,290 at a weight ratio of 2:1. A solution (35% by weight) of the mixture in DMAC was prepared to be used as an antioxidant solution (35% by weight). Each of the polyurethane resin solutions [(P-1) to (P-9) and (R-1) to (R-4)] obtained in Examples 1 to 9 and Comparative Examples 1 to 4 (97% by weight) and the antioxidant solution (3% by weight) were uniformly mixed to prepare a solution. This solution was subjected to dry spinning at 490 m/min and a speed ratio of a godet roller to a winder of 1.4. Thus, 300 g of wound polyurethane elastic fibers (33 dtex, 3 filaments) were obtained.
[10] Breaking Elongation, Breaking Strength, Stress Relaxation, and Permanent Strain of Polyurethane Elastic Fibers
The breaking strength, the stress relaxation, the permanent strain, and the breaking elongation were measured by subjecting a sample yarn to a tensile test using an Instron 4502 tensile tester.
These properties are defined as follows. A sample (5 cm (L1)) was stretched 300% at a pulling speed of 50 cm/min five times. The stress at the fifth stretch is taken as (G1).
Subsequently, 300% stretch was held for 30 seconds. The stress after the 30-second holding is taken as (G2). Then, the sample was allowed to recover from the stretch. The length of the sample yarn when the stress reached 0 is taken as (L2). Thereafter, the sample yarn was stretched for the sixth time until the yarn broke. The stress at break is taken as (G3), and the length of the sample yarn at break is taken as (L3).

The above properties are determined in accordance with the following formulae.

Breaking strength=(G3)

Stress relaxation=100×((G1)−(G2))/(G1)

Permanent strain=100×((L2)−(L1))/(L1)

Breaking elongation=100×((L3)−(L1))/(L1)

[11] Thermal Softening Point of Polyurethane Elastic Fibers

The temperature dispersion of the dynamic storage elastic modulus E' was measured at a rate of temperature increase of 10° C./min using a dynamic elastic modulus analyzer RSA II, available from Rheometric Scientific, Inc. The thermal softening point was determined from the intersection point at which the tangent on the E' curve in the plateau region from 80° C. to 130° C. intersects the tangent on the E' curve in the region where E' drops owing to thermal softening at 160° C. or higher. E' is plotted on the logarithmic axis, and the temperature on the linear axis.

Figure 3:
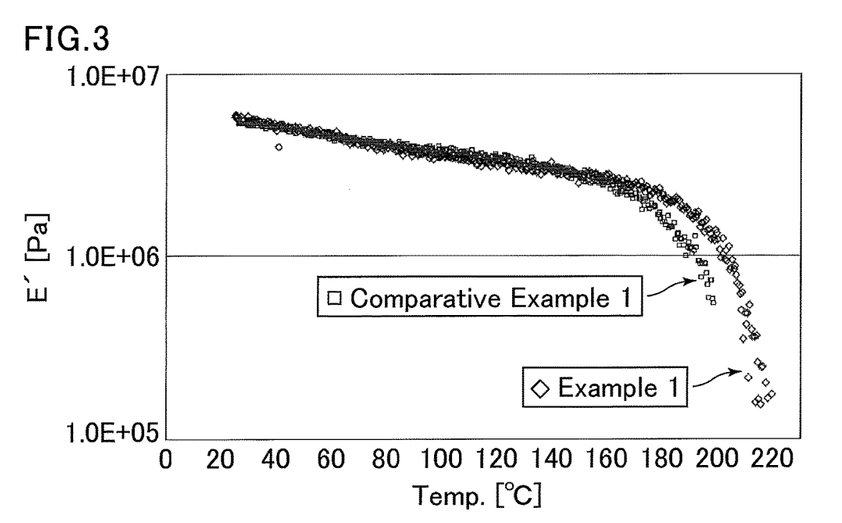
FIG. 3 is an evaluation diagram of elastic fibers in Example 1 and Comparative Example 1.

FIG. 3 is an evaluation diagram of elastic fibers, showing measurement curves of the thermal softening point of the elastic fibers in Example 1 and Comparative Example 1.

[12] Heat-Setting Properties of Polyurethane Elastic Fibers

A sample yarn (length=L5) was stretched 100% (length=2×(L5)). While the length was held, the yarn was heat-treated at 160° C. for one minute. The yarn was further allowed to stand at room temperature for one day while the same length was held. Thereafter, the sample yarn was released from the stretch, and the length (L6) of the yarn was measured.

Heat-setting properties=100×((L6)−(L5))/(L5)

The higher this value is, the better the heat-setting properties are.

[13] Chemical Resistance of Polyurethane Elastic Fibers

A yarn was held at a 100% stretch state and subjected to the following three exposure treatments. First, the yarn was immersed in a solution of oleic acid (5% by weight) in hexane for one hour. Next, a hypochlorous acid solution (chlorine concentration: 500 ppm) was prepared, and the yarn was immersed therein for two hours. Then, the yarn was exposed to UV for two hours. The UV exposure treatment was performed using a carbon arc-type fade meter, available from Suga Test Instruments Co., Ltd., at 63° C. and 60% RH. This exposure treatment was performed twice. Thereafter, the yarn was allowed to stand in a state free from treatments for 24 hours at room temperature. The breaking strength (G4) was measured in the same manner as described above. The ratio (retention) of the breaking strength (G4) of the treated yarn to the breaking strength (G3) of an untreated yarn is taken as the chemical resistance.

Chemical resistance (%)=100×(G4)/(G3)

[14] Coefficient of Variation of Fineness of Polyurethane Elastic Fibers

On the surface of the package of the wound polyurethane elastic fibers, the first 50 m of the polyurethane elastic fibers were removed to eliminate inaccuracy due to handling damage. Then, polyurethane elastic fibers were drawn from the package for 130 seconds using a rolling take-off unit, and passed through a tensiometer equipped with a piezoceramic pin. The circumference of the take-up roll was 50% greater than that of the feed roll, and these rolls rotated at the same speed. As a result, the polyurethane elastic fibers were elongated 50% when they pass through the tensiometer. The tension when the polyurethane elastic fibers were fed through the roll was measured with the tensiometer. Since the fineness of the fibers is directly proportional to the tension, the coefficient of variation was obtained by dividing the standard deviation of the tension by the average tension. The coefficient of variation of the fineness is independent of the fineness of the fibers. A small coefficient of variation of the fineness of the fibers indicates high fiber uniformity.

[15] A Stretch Woven Fabric was Prepared in the Following Manner. The Appearance of the Fabric was Evaluated.

The obtained polyurethane elastic fibers were subjected to covering processing. A nylon filament 168 dtex-24 fil was used as a covering yarn. A covered yarn for weft was prepared with a covering machine at a number of twists of 450 t/m and a draft of 3.0. Similarly, a covered yarn for warp was prepared with a covering machine using the same nylon filament covering yarn at a number of twists of 700 t/m and a draft of 3.5.

Subsequently, the covered yarns were warped and weaved. Specifically, 5100 warp yarns (beam warping 1100 yarns) were sized and warped, and then the yarns were woven into a 2/1 twill using a Rapier loom.

Thereafter, the fabric was dyed. The gray fabric obtained by the weaving was subjected to, sequentially, refinement, intermediate setting (175° C.), embossment (180° C.), dyeing (98° C.), drying, a finishing-agent treatment, and finishing setting (175° C., cloth-feeding speed: 20 m/min, setting zone: 24 m) by usual methods.

The appearance was visually evaluated in accordance with the following criteria.
○: No defects were observed in the stretch woven fabric.
Δ: Streaks in the warp direction were observed on the stretch woven fabric.
x: Yarns frequently broke during the preparation of the covered yarns.

TABLE 2

| | | Example | | | | | | |
|---|---|---|---|---|---|---|---|---|
| | | 1 (P-1) | 2 (P-2) | 3 (P-3) | 4 (P-4) | 5 (P-5) | 6 (P-6) | 7 (P-7) |
| | Polyurethane resin solution | | | | | | | |
| Production conditions | Number of moles of hydroxy groups of (a1):number of moles of isocyanates groups of (b1) | 1:1.05 | 1:1.2 | 1:1.3 | 1:1.5 | 1:1.05 | 1:1.05 | 1:1.05 |
| | [Total number of moles of isocyanates of (b1) and (b2)]/number of moles of hydroxy groups of (a1) | 2.7 | 2.7 | 2.7 | 2.7 | 4.2 | 2.0 | 2.7 |

TABLE 2-continued

|  |  | | | | | | | |
|---|---|---|---|---|---|---|---|---|
| | Relation between total number of moles of isocyanate groups of (b1) and (b2) and total number of moles of hydroxy groups of (a1) and (a2) | Equal | Equal | Equal | Equal | Equal | Equal | Equal |
| | Weight proportion (%) of isocyanate groups in reaction mixture when (a3) is added | 0.011 | 0.012 | 0.012 | 0.011 | 0.011 | 0.011 | 0.012 |
| | Production method | Pre-polymer method | Pre-polymer method | Pre-polymer method | Pre-polymer method | Pre-polymer method | Pre-polymer method | Pre-polymer method |
| Polyurethane resin composition | Total concentration of urethane groups and urea groups (mmol/g) | 1.93 | 1.93 | 1.93 | 1.93 | 1.94 | 1.92 | 1.93 |
| | Average domain size (nm) of hard segment domains | 23.3 | 22.6 | 22.3 | 22.1 | 24.0 | 23.1 | 23.2 |
| | Number average molecular weight ($M_{B1}$) of block (B1) | 44,750 | 11,000 | 7,250 | 4,250 | 64,750 | 34,750 | 44,750 |
| | Number average molecular weight ($M_{B2}$) of block (B2) | 11,046 | 3,090 | 2,206 | 1,499 | 20,406 | 6,678 | 11,046 |
| | Number average molecular weight of polyurethane resin | 53,000 | 56,000 | 61,000 | 62,000 | 57,000 | 49,000 | 45,000 |
| Evaluation results | Tensile strength at break (MPa) | 67 | 68 | 71 | 72 | 68 | 66 | 65 |
| | Elongation at break (%) | 700 | 700 | 700 | 700 | 680 | 700 | 720 |
| | Residual strain (%) | 30 | 31 | 31 | 32 | 31 | 34 | 31 |
| | Thermal softening point (° C.) | 230 | 226 | 222 | 220 | 236 | 228 | 230 |

|  |  | Example | | Comparative Example | | | |
|---|---|---|---|---|---|---|---|
| | | 8 | 9 | 1 | 2 | 3 | 4 |
| Polyurethane resin solution | | (P-8) | (P-9) | (R-1) | (R-2) | (R-3) | (R-4) |
| Production conditions | Number of moles of hydroxy groups of (a1):number of moles of isocyanates groups of (b1) | 1:1.05 | 1:1.05 | — | — | 1:1.7 | 1:1.05 |
| | [Total number of moles of isocyanates of (b1) and (b2)]/number of moles of hydroxy groups of (a1) | 2.7 | 3.4 | 2.7 | 4.0 | 2.7 | 5.0 |
| | Relation between total number of moles of isocyanate groups of (b1) and (b2) and total number of moles of hydroxy groups of (a1) and (a2) | Equal | Equal | Equal | Equal | Equal | Equal |
| | Weight proportion (%) of isocyanate groups in reaction mixture when (a3) is added | 0.012 | 0.011 | 0.011 | 0.012 | 0.011 | 0.012 |
| | Production method | Pre-polymer method | Pre-polymer method | One-shot method | One-shot method | Pre-polymer method | Pre-polymer method |
| Polyurethane resin composition | Total concentration of urethane groups and urea groups (mmol/g) | 1.93 | 1.94 | 1.93 | 2.47 | 1.93 | 2.82 |
| | Average domain size (nm) of hard segment domains | 23.3 | 23.3 | 18.6 | 18.8 | 18.7 | 23.3 |
| | Number average molecular weight ($M_{B1}$) of block (B1) | 44,750 | 44,750 | — | — | 2,964 | 44,750 |
| | Number average molecular weight ($M_{B2}$) of block (B2) | 11,046 | 15,414 | — | — | 1,214 | 25,398 |
| | Number average molecular weight of polyurethane resin | 53,000 | 65,000 | 57,000 | 64,000 | 55,000 | 60,000 |
| Evaluation results | Tensile strength at break (MPa) | 67 | 75 | 68 | 78 | 67 | 90 |
| | Elongation at break (%) | 700 | 680 | 700 | 550 | 700 | 500 |
| | Residual strain (%) | 31 | 34 | 38 | 50 | 37 | 60 |
| | Thermal softening point (° C.) | 230 | 231 | 205 | 215 | 206 | 235 |

TABLE 3

|  |  | Example | | | | | | | | | Comparative Example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Polyurethane elastic fiber | | (L-1) | (L-2) | (L-3) | (L-4) | (L-5) | (L-6) | (L-7) | (L-8) | (L-9) | (L'-1) | (L'-2) | (L'-3) | (L'-4) |
| Elastic fiber evaluation results | Breaking elongation (%) | 480 | 470 | 470 | 465 | 455 | 480 | 485 | 470 | 460 | 395 | 340 | 405 | 360 |
| | Breaking strength (cN) | 28 | 29 | 29 | 27 | 27 | 30 | 26 | 28 | 30 | 25 | 36 | 24 | 38 |
| | Permanent strain (%) | 19 | 20 | 20 | 20 | 22 | 20 | 19 | 20 | 20 | 27 | 38 | 25 | 43 |
| | Stress relaxation (%) | 30 | 31 | 33 | 33 | 34 | 31 | 32 | 31 | 32 | 34 | 42 | 32 | 47 |
| | Thermal softening point (° C.) | 198 | 199 | 195 | 195 | 206 | 198 | 200 | 201 | 204 | 182 | 185 | 182 | 188 |
| | Heat setting (%) | 53 | 52 | 55 | 56 | 51 | 52 | 52 | 51 | 53 | 52 | 48 | 52 | 44 |

TABLE 3-continued

|  | Example | | | | | | | | | Comparative Example | | | |
| --- | --- | --- | --- | --- | --- | --- | --- | --- | --- | --- | --- | --- | --- |
| Polyurethane elastic fiber | 1 (L-1) | 2 (L-2) | 3 (L-3) | 4 (L-4) | 5 (L-5) | 6 (L-6) | 7 (L-7) | 8 (L-8) | 9 (L-9) | 1 (L'-1) | 2 (L'-2) | 3 (L'-3) | 4 (L'-4) |
| Chemical resistance (%) | 83 | 77 | 75 | 75 | 87 | 80 | 82 | 80 | 84 | 33 | 42 | 38 | 51 |
| Coefficient of variation of fineness (—) | 8.1 | 8.9 | 8 | 9.3 | 7.9 | 8.8 | 8.3 | 8.1 | 8.5 | 28.6 | 22.2 | 21.7 | 23.4 |
| Appearance evaluation | ○ | ○ | ○ | ○ | ○ | ○ | ○ | ○ | ○ | Δ | Δ | Δ | x |

The films (urethane sheets) obtained from the polyurethane resin solutions of Examples 1 to 9 had high heat resistance and excellent stretching properties. The films (urethane sheets) obtained from the polyurethane resin solutions of Comparative Examples 1 to 3 had a low thermal softening point. The film (urethane sheet) obtained from the polyurethane resin solution of Comparative Example 4 had poor stretching properties.

The stretch woven fabrics obtained from the polyurethane elastic fibers of Examples 1 to 9 had no defects and had excellent appearance. The stretch woven fabrics obtained from the polyurethane elastic fibers of Comparative Examples 1 to 3 had streaks in the warp direction, exhibiting poor appearance. In Comparative Example 4, yarns frequently broke during the preparation of the covered yarns. In particular, it was difficult to obtain a covered yarn for warp.

INDUSTRIAL APPLICABILITY

The polyurethane resin of the present invention has excellent heat resistance and stretching properties. Fibers containing the polyurethane resin of the present invention have excellent heat-setting properties. The polyurethane resin of the present invention is thus useful as a polyurethane resin to be used in materials for elastomers such as various films, paints, coating agents, sealing materials, adhesives, fiber processing agents, artificial or synthetic leathers, and rolls, and fiber products such as elastic fibers.

The invention claimed is:
1. A polyurethane resin comprising, as constituent units:
a diol (a1) having a number average molecular weight of 500 to 10,000;
an organic diisocyanate (b); and
a chain extender (a2),
the total concentration of urethane groups and urea groups in the polyurethane resin being 1.25 to 2.50 mmol/g based on the weight of the polyurethane resin,
hard segment domains of the polyurethane resin having an average domain size of 20 to 30 nm as measured with an atomic force microscope,
wherein the chain extender (a2) comprises ethylene glycol,
wherein the polyurethane resin has a thermal softening point of 180° C. to 280° C., and
wherein the polyurethane resin satisfies the following requirements (1) to (3):
(1) the ratio of the number of moles of the diol (a1) having a number average molecular weight of 500 to 10,000 to the number of moles of an organic diisocyanate (b1) that reacts with the diol (a1) having a number average molecular weight of 500 to 10,000 is 1:1.05 to 1:1.5;
(2) the total number of moles of isocyanate groups of the organic diisocyanate (b1) and isocyanate groups of an organic diisocyanate (b2) that reacts with the chain extender (a2) is 1.3 to 4.2 times the number of moles of hydroxy groups of the diol (a1) having an number average molecular weight of 500 to 10,000; and
(3) the total number of moles of the diol (a1) having a number average molecular weight of 500 to 10,000 and the chain extender (a2) is equal to the total number of moles of the organic diisocyanate (b1) and the organic diisocyanate (b2).

2. The polyurethane resin according to claim 1,
wherein the polyurethane resin comprises a block (B1) and a block (B2),
the block (B1) includes the diol (a1) having a number average molecular weight of 500 to 10,000 and an organic diisocyanate (b1) that reacts with the diol (a1) having a number average molecular weight of 500 to 10,000,
the block (B1) has a number average molecular weight ($M_{B1}$) of 4,000 to 80,000 as calculated by Formula (1):

$$M_{B1} = \frac{k \times M_{a1} + r \times M_{b1}}{r - k} - M_{b1} \times 2 \quad (1)$$

wherein $M_{a1}$ represents the number average molecular weight of the diol (a1) having a number average molecular weight of 500 to 10,000; $M_{b1}$ represents the number average molecular weight of the organic diisocyanate (b1); k represents the number of moles of the diol (a1) having a number average molecular weight of 500 to 10,000; and r represents the number of moles of the organic diisocyanate (b1),
the block (B2) includes the chain extender (a2) and an organic diisocyanate (b2) that reacts with the chain extender (a2), and
the block (B2) has a number average molecular weight ($M_{B2}$) of 1,400 to 25,000 as calculated by Formula (2):

$$M_{B2} = \frac{i \times M_{a2} + j \times M_{b2}}{i - j} + M_{b2} \times 2 \quad (2)$$

wherein $M_{a2}$ represents the number average molecular weight of the chain extender (a2); $M_{b2}$ represents the number average molecular weight of the organic diisocyanate (b2); i represents the number of moles of the chain extender (a2); and j represents the number of moles of the organic diisocyanate (b2).

3. The polyurethane resin according to claim 1,
wherein the diol (a1) having a number average molecular weight of 500 to 10,000 is at least one diol selected from the group consisting of polyoxyethylene glycol, poly(oxy-1,2-propylene)glycol, polyoxytetramethylene glycol, a copolymer diol of tetrahydrofuran and ethylene oxide, and a copolymer diol of tetrahydrofuran and 3-methyltetrahydrofuran.

4. The polyurethane resin according to claim 1,
wherein the organic diisocyanate (b) comprises a C8-C26 aromatic diisocyanate.

5. The polyurethane resin according to claim 1,
wherein the polyurethane resin has a number average molecular weight of 20,000 to 200,000.

6. The polyurethane resin according to claim 1, which is used for a paint, a coating agent, a sealing material, an adhesive, a fiber processing agent, an artificial leather, a synthetic leather, or a roll.

7. The polyurethane resin according to claim 1, which is used for elastic fibers.

8. A polyurethane resin composition comprising:
the polyurethane resin according to claim 1; and
an additive.

9. A polyurethane resin composition comprising:
the polyurethane resin according to claim 7; and
an additive.

10. A method of producing the polyurethane resin according to claim 1, comprising:
the step of reacting an isocyanate group-containing urethane prepolymer (p), an organic diisocyanate (b2), and a chain extender (a2), the chain extender (a2) comprising ethylene glycol,
wherein the isocyanate group-containing urethane prepolymer (p) is obtained by reacting a diol (a1) having a number average molecular weight of 500 to 10,000 and an organic diisocyanate (b1), and the method satisfies the following requirements (1) to (3):

(1) The ratio of the number of moles of the diol (a1) having a number average molecular weight of 500 to 10,000 to the number of moles of the organic diisocyanate (b1) is 1:1.05 to 1:1.5;

(2) The total number of moles of isocyanate groups of the organic diisocyanate (b1) and isocyanate groups of the organic diisocyanate (b2) is 1.3 to 4.2 times the number of moles hydroxy groups of the diol (a1) having a number average molecular weight of 500 to 10,000; and (3) The total number of moles of the diol (a1) having a number average molecular weight of 500 to 10,000 and the chain extender (a2) is equal to the total number of moles of the organic diisocyanate (b1) and the organic diisocyanate (b2).

* * * * *